(12) United States Patent
Cho et al.

(10) Patent No.: US 9,601,727 B2
(45) Date of Patent: Mar. 21, 2017

(54) BATTERY PACK

(71) Applicant: Samsung SDI Co., Ltd., Yongin-si, Gyeonggi-do (KR)

(72) Inventors: Mansik Cho, Yongin-si (KR); Myungsup Seo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 882 days.

(21) Appl. No.: 13/903,749

(22) Filed: May 28, 2013

(65) Prior Publication Data

US 2014/0199573 A1   Jul. 17, 2014

(30) Foreign Application Priority Data

Jan. 17, 2013   (KR) .................. 10-2013-0005497

(51) Int. Cl.
   *H01M 2/10*   (2006.01)
   *H01M 10/42*   (2006.01)

(52) U.S. Cl.
   CPC ......... *H01M 2/1016* (2013.01); *H01M 2/105* (2013.01); *H01M 10/425* (2013.01); *H01M 2200/00* (2013.01)

(58) Field of Classification Search
   CPC .. H01M 2/105; H01M 10/425; H01M 2/1016; H01M 2/12; H01M 2200/00
   See application file for complete search history.

(56) References Cited

U.S. PATENT DOCUMENTS

2010/0047676 A1 * 2/2010 Park ...................... H01M 2/105
                                                                429/93
2011/0244298 A1   10/2011 Guener et al.

FOREIGN PATENT DOCUMENTS

| JP | 2007-317579 A | * 12/2007 | .............. H01M 2/10 |
| JP | 2009-259752 A | 11/2009 | |
| JP | 2010-027501 A | 2/2010 | |
| KR | 10-2011-0089869 A | 8/2011 | |
| WO | WO2012/132186 A1 | * 10/2012 | .......... H01M 2/0242 |

OTHER PUBLICATIONS

Yoneda, JP2007-317579A, Machine Translation, Dec. 2007.*
WO2012/132186, Naito, Machine Translation, Oct. 2012.*

* cited by examiner

*Primary Examiner* — Devina Pillay
(74) *Attorney, Agent, or Firm* — Knobbe Martens Olson & Bear LLP

(57) ABSTRACT

A battery pack is disclosed. In one aspect, the battery pack includes a battery cell comprising first and second sides opposing each other, a first cell holder coupled to the first side of the battery cell and a second cell holder coupled to the second side of the battery cell. The battery pack further includes a first protection circuit module (PCM) holder coupled to a surface of the first cell holder and a second PCM holder coupled to a surface of the second cell holder and combined with the first PCM holder. According to one embodiment, the battery pack can facilitate combination and assembly of battery cells and a protection circuit module.

20 Claims, 6 Drawing Sheets

BATTERY PACK

CROSS-REFERENCE TO RELATED APPLICATION

This application claims the benefit of Korean Patent Application No. 10-2013-0005497 filed on Jan. 17, 2013, the contents of which are incorporated herein by reference in their entirety.

BACKGROUND

1. Field

The described technology generally relates to a battery pack.

2. Description of the Related Technology

Unlike a primary battery, a secondary battery may be charged and discharged multiple times. Types of secondary batteries include a low capacity battery including a battery cell in the form of a pack and typically used for small portable electronic devices such as cellular phones and camcorders, and a high capacity battery including dozens of battery cells connected to one another and typically used as a motor-driving power source for electric scooters, hybrid vehicles, or electric vehicles.

SUMMARY

One inventive aspect is a battery pack, which can facilitate combination and assembling of battery cells and a protection circuit module.

Another aspect is a battery pack including a battery cell, a first cell holder coupled to one side of the battery cell, a second cell holder coupled to the other side of the battery cell, a first protection circuit module (PCM) holder coupled to one surface of the first cell holder, and a second PCM holder coupled to one surface of the second cell holder and combined with the first PCM holder.

The first cell holder may include a first surface, a second surface opposite to the first surface, and four side surfaces connecting the first surface and the second surface.

The first cell holder may include a cell hole passing through the first surface and the second surface, fixing protrusions formed on internal surface of the cell hole, a locking protrusion protruding on the first surface and extending to the cell hole, and coupling portions formed on its side surfaces.

Each of the coupling portions may include a coupling protrusion formed at one side of the side surfaces, and a coupling groove formed at the other side of the side surfaces and formed to correspond to the coupling protrusion.

The coupling portion may further include a curved part formed at a corner where neighboring side surfaces meet and having a predetermined curvature. The curved part forms a path for discharging heat generated from the battery cell. Fixing grooves corresponding to the fixing protrusions nay be formed on the side surface of the battery cell.

A diameter of the cell hole may be the same as that of the battery cell. The cell hole may allow the electrode terminal of the battery cell to be exposed to the outside. Lower coupling portions corresponding to coupling portions of the first cell holder may be formed on a bottom surface of the first PCM holder, and the lower coupling portions may be coupled to the coupling portions in a sliding manner.

Preventing bumps for preventing the first PCM holder and the second PCM holder from being separated from the first cell holder and the second cell holder may be formed at one ends of the first PCM holder and the second PCM holder. A first fastening portion may be formed at the other end of the first PCM holder, and a second fastening portion fastened to the first fastening portion may be formed at the other end of the second PCM holder.

The first fastening portion may include a first fastening lead protruding to the outside from the other end of the first PCM holder, a first fastening groove formed inwardly from the other end of the first PCM holder and parallel with the first fastening lead, and a first protrusion hole formed in the first fastening groove and opened to a top surface of the first PCM holder.

The second fastening portion may include a second fastening lead protruding from the other end of the second PCM holder and coupled to the first fastening groove, a second fastening groove formed inwardly from the other end of the second PCM holder and coupled to the first fastening lead, and a second protrusion hole formed in the second fastening groove and opened to a top surface of the second PCM holder.

A first protrusion may be formed in the first fastening lead, and the first protrusion may be engaged with the second protrusion hole. The second protrusion may be formed in the second fastening lead, and the second protrusion may be engaged with the first protrusion hole. The battery pack may further include a protection circuit module (PCM) mounted on the first PCM holder and the second PCM holder.

Each of first PCM holder and the second PCM holder may further include a coupling member groove protruding on a top surface thereof, and a coupling member may be coupled to the coupling member groove to fix the PCM to the first PCM holder and the second PCM holder. The battery pack may further include a dummy member formed on the top surface of each of the first PCM holder and the second PCM holder to be spaced apart from the coupling member groove and having the same height as the coupling member groove.

Another aspect is a battery pack comprising: a battery cell comprising first and second sides opposing each other; a first cell holder coupled to the first side of the battery cell; a second cell holder coupled to the second side of the battery cell; a first protection circuit module (PCM) holder coupled to a surface of the first cell holder; and a second PCM holder coupled to a surface of the second cell holder and combined with the first PCM holder.

In the above battery pack, the first cell holder comprises i) a first surface, ii) a second surface opposite to the first surface, and iii) four side surfaces interconnecting the first and second surfaces. In the above battery pack, a cell hole passing through the first and second surfaces is defined in the first cell holder, and wherein the first cell holder comprises i) a plurality of fixing protrusions formed on an internal surface of the cell hole, ii) a locking protrusion protruding from the first surface of the first cell holder, and iii) a plurality of coupling portions formed on the side surfaces.

In the above battery pack, each of the coupling portions comprises a coupling protrusion formed at a first side of the side surfaces, wherein a coupling groove fondled at a second side of the side surfaces and formed to correspond to the coupling protrusion, and wherein the first and second sides are opposing each other. In the above battery pack, the coupling portion further comprises a curved part formed at a corner where neighboring side surfaces meet and having a predetermined curvature. In the above battery pack, the curved part forms a path configured to discharge heat generated from the battery cell.

In the above battery pack, a plurality of fixing grooves corresponding to the fixing protrusions are formed between the first and second sides of the battery cell. In the above battery pack, the diameter of the cell hole is substantially the same as that of the battery cell. In the above battery pack, the cell hole is configured to expose an electrode terminal of the battery cell to the environment. In the above battery pack, a plurality of lower coupling portions corresponding to the coupling portions of the first cell holder are formed on a bottom surface of the first PCM holder, and wherein the lower coupling portions are slidably coupled to the coupling portions. In the above battery pack, at least one preventing bump is formed at an end of each of the first and second PCM holders, wherein the preventing bump is configured to substantially prevent the first and second PCM holders from being separated from the first and second cell holders.

In the above battery pack, a first fastening portion is formed at a first end of the first PCM holder, wherein a second fastening portion is formed at a second end of the second PCM holder and fastened to the first fastening portion, and wherein the first and second ends face each other. In the above battery pack, the first fastening portion comprises i) a first fastening lead protruding from the first end of the first PCM holder, ii) a first fastening groove formed inwardly from the first end of the first PCM holder and substantially parallel with the first fastening lead, and iii) a first protrusion hole formed in the first fastening groove and opened toward a top surface of the first PCM holder.

In the above battery pack, the second fastening portion comprises i) a second fastening lead protruding from the second end of the second PCM holder and coupled to the first fastening groove, ii) a second fastening groove formed inwardly from the second end of the second PCM holder and coupled to the first fastening lead, and iii) a second protrusion hole formed in the second fastening groove and opened toward a top surface of the second PCM holder. In the above battery pack, a first protrusion is formed in the first fastening lead, and wherein the first protrusion is configured to be engaged with the second protrusion hole. In the above battery pack, the second protrusion is formed in the second fastening lead, and wherein the second protrusion is configured to be engaged with the first protrusion hole. In the above battery pack, wherein each of the first and second PCM holders further comprises a coupling member groove protruding from a top surface thereof, and wherein a coupling member is configured to be coupled to the coupling member groove to fix a PCM to the first and second PCM holders. The above battery pack further comprises a dummy member formed on the top surface of each of the first and second PCM holders to be spaced apart from the coupling member groove and having substantially the same height as the coupling member groove.

Another aspect is a battery pack comprising: a first cell holder configured to hold a first portion of a battery cell; a second cell holder configured to hold a second portion of the battery cell, wherein the first portion is different from the first portion; a protection circuit module (PCM); a first PCM holder comprising first and second surfaces opposing each other, wherein the first surface is slidably coupled to the first cell holder, and wherein the second surface is coupled to the PCM; and a second PCM holder comprising first and second surfaces opposing each other, wherein the first surface of the second PCM holder is slidably coupled to the second cell holder, wherein the second surface of the second PCM holder is coupled to the PCM, and wherein the first and second PCM holders are configured to be attached to and detached from each other.

In the above battery pack, at least one protrusion is formed in the first PCM holder, wherein at least one groove is formed in the second PCM holder, and wherein the first and second PCM holders are configured to be attached to and detached from each other via the protrusion and groove.

DETAILED DESCRIPTION

Figure 1:
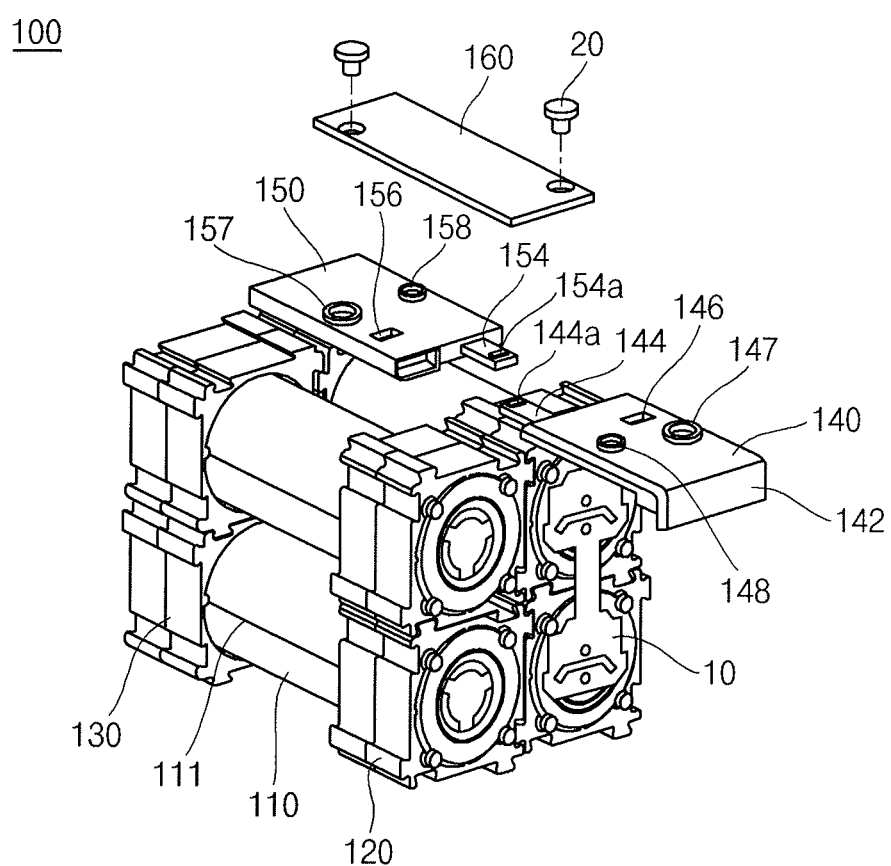
FIG. 1 is a perspective view of a battery pack according to an embodiment.

Generally, in a high capacity battery, various outputs and capacities can be implemented by adjusting the number of battery cells connected to each other. In particular, in order to assemble cylindrical battery cells, a fixing device for maintaining the arrangement structure of the battery cells is required, which makes it difficult to assemble a battery pack including the cylindrical battery cells.

Embodiments will now be described in detail with reference to the accompanying drawings.

Referring to FIGS. 1 to 7, a battery pack 100 includes a battery cell 110, a first cell holder 120, a second cell holder 130, a protection circuit module (PCM) 160, a first PCM holder 140 and a second PCM holder 150.

In one embodiment, the battery cell 110 is a cylindrical secondary battery that can be repeatedly charged and discharged. One side of the battery cell 110 is a positive electrode, and the other side of the battery cell 110 is a negative electrode. A plurality of battery cells 110 may constitute a single battery pack 100. The battery cells 110 are horizontally arranged to be substantially parallel with each other so that positive and negative electrodes are exposed. The battery cells 110 are connected to each other in series or in parallel by a conductive tab 10. Fixing grooves 111 may be formed on the side surface of the battery cell 110. In one embodiment, the fixing grooves 111 are formed on the side surface of the cylindrical can of the battery cell 110 and are lengthwise formed along the longitudinal direction of the battery cell 110. In addition, the fixing grooves 111 are coupled to fixing protrusions 122 and 132 of the first cell holder 120 and the second cell holder 130. The fixing grooves 111 may be configured to fix the battery cell 110 to the first and second cell holders 120 and 130, thereby preventing the battery cell 110 from rotating in the cell holders 120 and 130.

The first cell holder 120 is coupled to one side of the battery cell 110. In some embodiments, the first cell holder 120 is formed to cover only a portion of the battery cell 110. For example, the first cell holder 120 may be coupled to a positive electrode of the battery cell 110. The first cell holder 120 includes a cell hole 121, fixing protrusions 122, locking protrusions 123 and coupling portions 124.

In one embodiment, the first cell holder 120 is formed in a generally hexahedral shape. In another embodiment, each of the first and second cell holders 120 and 120 has another polygonal shape. The first cell holder 120 includes a first surface 120a, a second surface 120b opposite to the first surface 120a, and four side surfaces 120c connecting the first surface 120a and the second surface 120b. The cell hole 121 may be formed in the first cell holder 120.

The cell hole 121 may be centrally formed in the first cell holder 120 while passing through the first and second surfaces 120a and 120b of the first cell holder 120. The battery cell 110 is coupled to the cell hole 121 such that one side of the battery cell 110 passes through the cell hole 121. In one embodiment, the diameter of the cell hole 121 is substantially equal to that of the battery cell 110. In addition, the positive electrode of the battery cell 110 may be exposed to the environment through the cell hole 121.

The fixing protrusions 122 are formed on the internal surface of the first cell holder 120 having the cell hole 121. The fixing protrusions 122 are engaged with the fixing grooves 111 of the battery cell 110. That is to say, when the first cell holder 120 is fitted into the battery cell 110, the fixing protrusions 122 are engaged with the fixing grooves 111 of the battery cell 110, thereby preventing the battery cell 110 from rotating in the first cell holder 120. Four of the fixing protrusions 122 are formed on internal side surfaces corresponding to the side surfaces 120c of the first cell holder 120. However, the number of the fixing protrusions 122 may be greater than or less than 4. Furthermore, one or more of the fixing protrusions 122 may be formed.

The locking protrusions 123 are formed in plurality on a surface of the first cell holder 120 to which the positive electrode of the battery cell 110 is exposed. For example, the locking protrusions 123 are formed on the first surface 120a to close a portion of the cell hole 121. In one embodiment, the locking protrusions 123 are formed to protrude on the first surface 120a of the first cell holder 120 and extend to the cell hole 121. In addition, the locking protrusions 123 may be formed at corners of the first cell holder 120. The locking protrusions 123 may prevent the battery cell 110 coupled thereto while passing through the cell hole 121 from being separated from the first cell holder 120. In other words, the locking protrusions 123 prevent the first cell holder 120 from moving toward the negative electrode of the battery cell 110 after the first cell holder 120 is coupled to the positive electrode of the battery cell 110.

The coupling portions 124 are formed on the side surfaces 120c of the first cell holder 120. In some embodiments, the coupling portions 124 are formed on the four side surfaces 120c of the first cell holder 120, respectively. The coupling portions 124 include a coupling protrusion 124a and a coupling groove 124b. In one embodiment, the coupling protrusion 124a is formed at one side of the side surface 120c, and the coupling groove 124b is formed at the other side of the side surface 120c. In this embodiment, the coupling protrusion 124a and the coupling groove 124b are formed at opposite directions on one of the side surfaces 120c. In some embodiments, the coupling protrusion 124a and the coupling groove 124b are shaped to correspond to each other, so that the coupling protrusion 124a is engaged with the coupling groove 124b. In these embodiments, since the coupling portions 124 are all formed on the side surfaces 120c of the first cell holder 120, the coupling protrusion 124a and the coupling groove 124b are adjacently formed at corners where neighboring ones of the side surfaces 120c meet.

Figure 2:
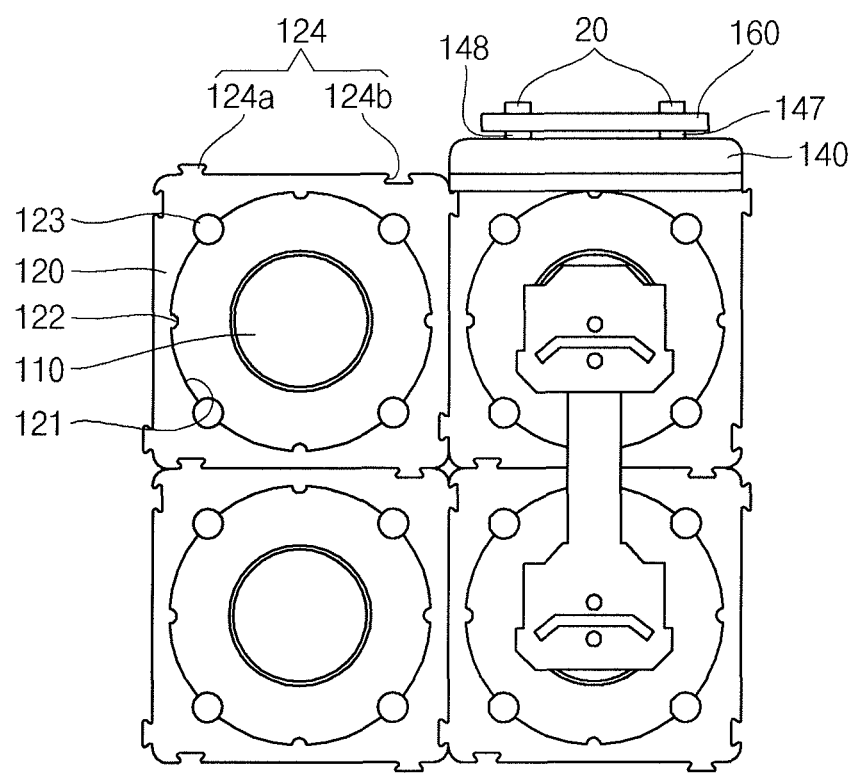
FIG. 2 is a front view of the battery pack shown in FIG. 1.
Figure 3:
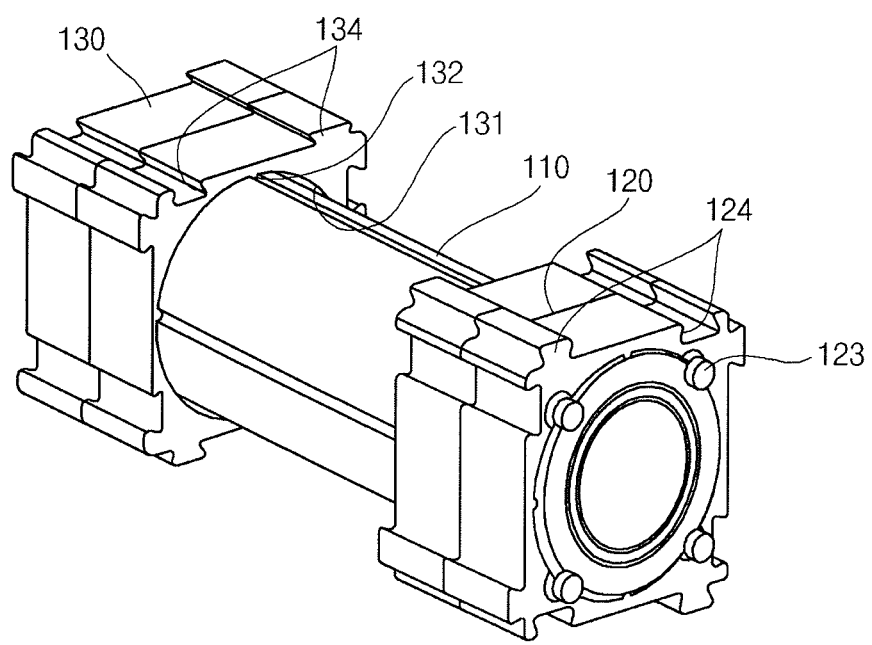
FIG. 3 is a perspective view illustrating a coupling relationship between a battery cell and a cell holder in the battery pack shown in FIG. 1.
Figure 4:
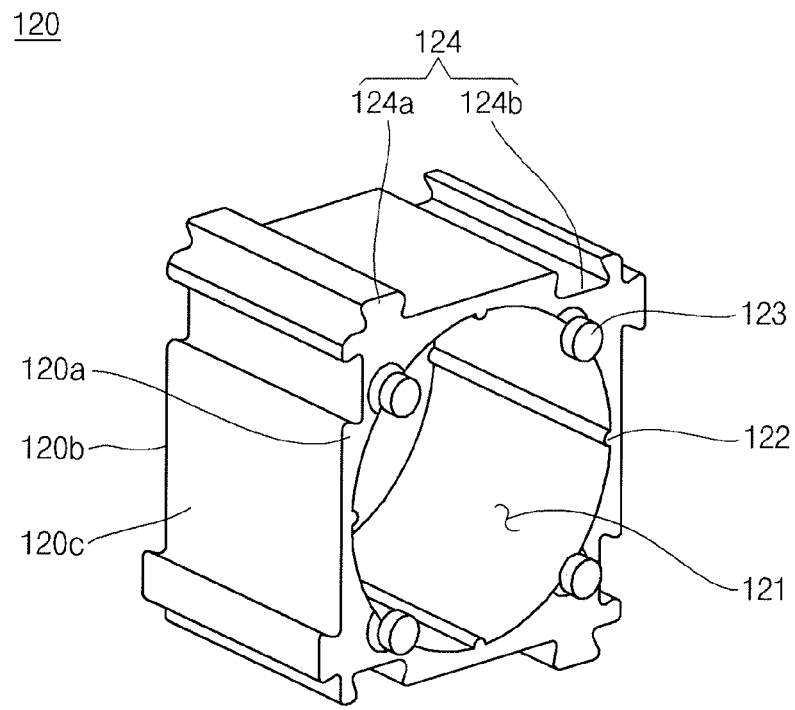
FIG. 4 is a perspective view illustrating a first cell holder shown in FIG. 1.

As shown in FIGS. 1 and 2, the coupling portions 124 may couple the first cell holder 120 to other neighboring first cell holder. The coupling protrusion 124a of the first cell holder 120 and a coupling groove of the other first cell holder may be slidably coupled to each other.

As described above, since the coupling portions 124 are formed on the side surfaces 120c of the first cell holder 120, they can be easily coupled to another cell holder in any direction of the first cell holder 120. Accordingly, the battery pack 100 including the battery cells 110 can be easily assembled.

The second cell holder 130 is coupled to the other side of the battery cell 110. In some embodiments, the second cell holder 130 is formed to cover only a portion of the battery cell 110. For example, the second cell holder 130 may be coupled to the negative electrode of the battery cell 110. The second cell holder 130 may include a cell hole 131, fixing protrusions 132, locking protrusions 133 and coupling portions 134. The second cell holder 130 may have substantially the same configuration and functions as the first cell holder 120.

The battery cell 110 is coupled to the cell hole 131, such that the other side of the battery cell 110 passes through the cell hole 131. In some embodiments, the diameter of the cell hole 131 is substantially equal to that of the battery cell 110. In addition, the negative electrode of the battery cell 110 is exposed to the environment through the cell hole 131.

The first PCM holder 140 is coupled to the first cell holder 120. In some embodiments, the first PCM holder 140 is coupled to the side surfaces 120c of the first cell holder 120. The first PCM holder 140 may have a plate shape, and have a planar top surface and a bottom surface opposite to the top surface. A protection circuit module (PCM) 160 is coupled to the top surface of the first PCM holder 140 and the first cell holder 120 is coupled to the bottom surface of the first PCM holder 140.

Figure 7:
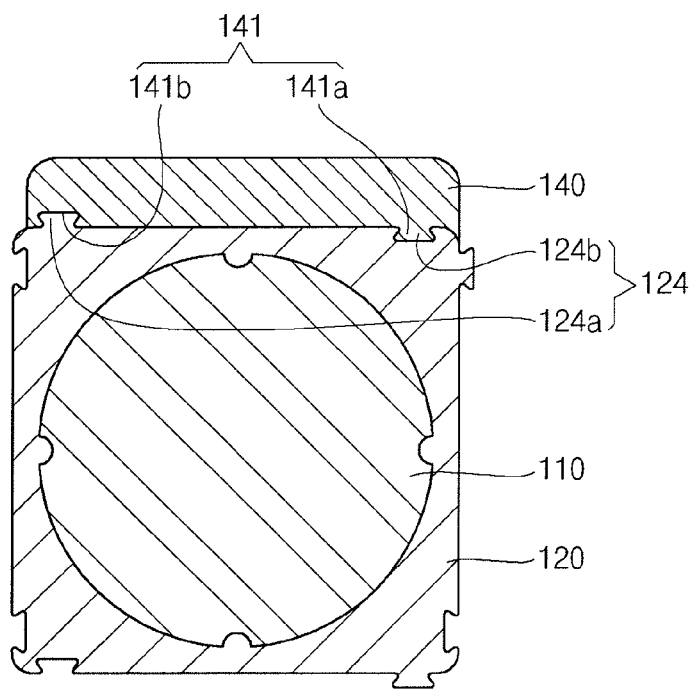
FIG. 7 is a cross-sectional view illustrating a state in which a first PCM holder is coupled to a first cell holder.

Referring to FIG. 7, lower coupling portions 141 coupled to the coupling portions 124 of the first cell holder 120 are formed on the bottom surface of the first PCM holder 140. The first PCM holder 140 may be slidably coupled to the first cell holder 120. For example, the lower coupling portions 141 are formed on the bottom surface of the first PCM holder 140 and include a lower coupling protrusion 141a and a lower coupling groove 141b corresponding to the coupling portions 124 of the first cell holder 120.

As the lower coupling portions 141 are coupled to the coupling portions 124 of the first cell holder 120 in a sliding manner, the first PCM holder 140 is coupled to the first cell holder 120. In some embodiments, the first PCM holder 140 is approximately half a length of the battery cell 110.

In one embodiment, as shown in FIG. 1, a preventing bump 142 is formed at one end of the first PCM holder 140. Once the first PCM holder 140 is coupled to the first cell holder 120, the preventing bump 142 prevents the first PCM holder 140 from moving toward the second cell holder 130.

In addition, a first fastening portion 143 (see FIG. 5) to be fastened to the second PCM holder 150 may be formed at the other end of the first PCM holder 140. The first fastening portion 143 includes a first fastening lead 144, a first fastening groove 145 and a first protrusion hole 146.

The first fastening lead 144 is formed to protrude from the first PCM holder 140. In some embodiments, the first fastening lead 144 is formed to be substantially parallel with the first PCM holder 140 and protrudes toward the second PCM holder 150. In addition, a first protrusion 144a is formed in the first fastening lead 144. The first protrusion 144a may be formed on a top surface of the first fastening lead 144 and engaged with a second protrusion hole 156 of the second PCM holder 150, which will later be described. In some embodiments, the first PCM holder 140 is substantially completely fastened with and fixed to the second PCM holder 150. For example, the first protrusion 144a fixes the first PCM holder 140 to the second PCM holder 150.

The first fastening groove 145 may be formed inwardly from the other end of the first PCM holder 140 and formed to be substantially parallel with the first fastening lead 144. For example, in view of the other end of the first PCM holder 140, the first fastening groove 145 is formed inwardly from the first PCM holder 140, and the first fastening lead 144 is formed to protrude to the outside of the first PCM holder 140. A second fastening lead 154 of the second PCM holder 150, which will later be described, is coupled to the first fastening groove 145.

The first protrusion hole 146 is formed in the first fastening groove 145, for example, on the top surface of the first PCM holder 140. The first protrusion hole 146 is engaged with a second protrusion 154a of the second fastening lead 154. In some embodiments, since the second protrusion 154a of the second fastening lead 154 is engaged with the first protrusion hole 146, the second PCM holder 150 is substantially completely fastened with and fixed to first PCM holder 140.

In addition, a coupling member groove 147 for coupling the PCM 160 to a coupling member 20 is formed on the top surface of the first PCM holder 140. The coupling member groove 147 is formed to protrude from the first PCM holder 140. In addition, a screw thread may be formed on, the internal surface of the coupling member groove 147. In addition, the first PCM holder 140 further includes a dummy member 148 spaced apart from the coupling member groove 146. The dummy member 148 protrudes toward the top surface of the first PCM holder 140 to have substantially the same height as the coupling member groove 146. The dummy member 148 may act as a support to allow the PCM 160 to be stably mounted on the first PCM holder 140.

The second PCM holder 150 is combined with the second cell holder 130. For example, the second PCM holder 150 is coupled to a side surface of the second cell holder 130. The second PCM holder 150 may have a plate shape, and have a planar top surface and a bottom surface opposite to the top surface. The PCM 160 is coupled to the top surface of the second PCM holder 150, and the second cell holder 130 is coupled to the bottom surface of the second PCM holder 150. Therefore, the bottom surface of the second PCM holder 150 is formed to correspond to the coupling portions 134 of the second cell holder 130, and the second PCM holder 150 is slidably coupled to the second cell holder 130. In some embodiments, the second PCM holder 150 is approximately half a length of the battery cell 110.

Figure 6:
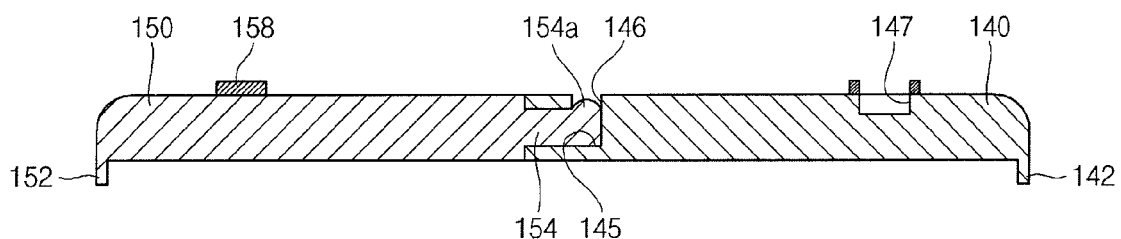
FIG. 6 is a cross-sectional view taken along the line I-I' of FIG. 5.

In one embodiment, as shown in FIG. 6, a preventing bump 152 is formed at one end of the second PCM holder 150. Once the second PCM holder 150 is coupled to the second cell holder 130, the preventing bump 152 prevents the second PCM holder 150 from moving toward the first cell holder 120.

In addition, a second fastening portion 153 (see FIG. 5) to be fastened to the first PCM holder 140 may be formed at the other end of the second PCM holder 150. The second fastening portion 153 includes a second fastening lead 154, a second fastening groove 155 and a second protrusion hole 156. The second PCM holder 150 may further include a coupling member groove 157 and a dummy member 158. Here, the second PCM holder 150 may have substantially the same configuration and functions as the first PCM holder 140. A coupling relationship between the first PCM holder 140 and the second PCM holder 150 will now be described.

Figure 5:
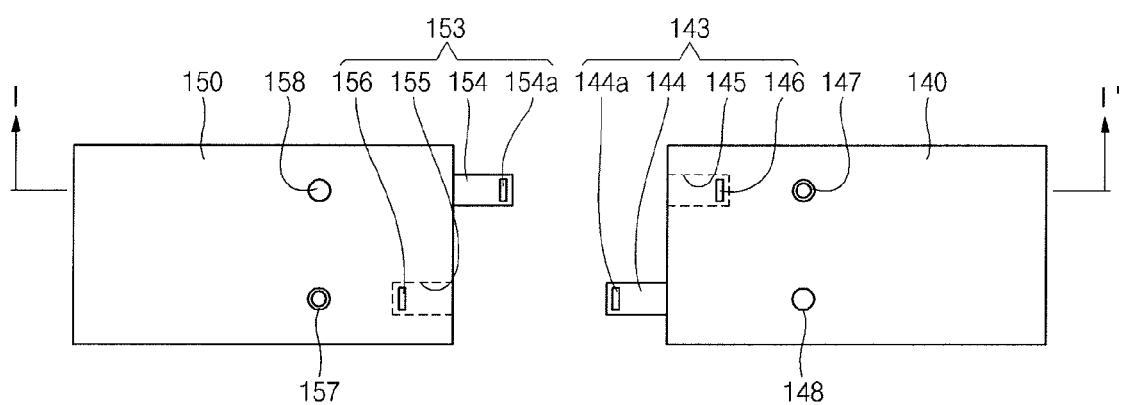
FIG. 5 is a plan view illustrating a PCM holder shown in FIG. 1.

Referring to FIGS. 5 and 6, a fastening relationship between the first fastening portion 143 of the first PCM holder 140 and the second fastening portion 153 of the second PCM holder 150 is illustrated.

The first and second fastening portions 143 and 153 are formed at the other ends of the first and second PCM holders 140 and 150, respectively. As the first and second fastening portions 143 and 153 are coupled to each other, the first and second PCM holders 140 and 150 are combined with each other. In addition, the first and second PCM holders 140 and 150 may fix the first and second cell holders 120 and 130 to the battery cell 110. That is to say, since the two PCM holders 140 and 150 are combined with each other, the cell holders 120 and 130 are not separated from the battery cell 110.

The first fastening lead 144 of the first fastening portion 143 is coupled to the second fastening groove 155 of the second fastening portion 153, and the second fastening lead 154 of the second fastening portion 153 is coupled to the first fastening groove 145 of the first fastening portion 143. Here, since the first protrusion 144a formed in the first fastening lead 144 is fitted in the second protrusion hole 156 of the second fastening portion 153, and the second protrusion 154a formed in the second fastening lead 154 is fitted in the first protrusion hole 146 of the first fastening portion 143, the first and second fastening portions 143 and 153 may be substantially completely fastened with and fixed to the each other. In addition, if the first and second protrusions 144a and 154a are pressed substantially simultaneously, the first and second PCM holders 140 and 150 can be separated from each other. Although the FIG. 5 embodiment shows a protrusion and groove pair formed in each of the first and second PCM holders 140 and 150, other configurations are also possible. For example, only at least one groove may be formed in one of the first and second PCM holders 140 and 150, and only at least one protrusion may be formed in the other PCM holder. Furthermore, a plurality of protrusion/groove pairs can be formed in each of the first and second PCM holders 140 and 150.

In some embodiments, the battery pack 100 includes the first and second PCM holders 140 and 150, thereby fixing the first and second cell holders 120 and 130 to the battery cell 110.

The PCM 160 is mounted on the first PCM holder 140 and the second PCM holder 150. For example, the PCM 160 is mounted in the coupling member grooves 147 and 157 and the dummy members 148 and 158 of the first and second PCM holders 140 and 150. Since the PCM 160 is electrically connected to the battery cell 110 through a conductive wire (not shown), over-charge and over-discharge of the battery cell 110 can be prevented. A plurality of semiconductor devices (not shown) may be formed in the PCM 160. In addition, after the PCM 160 is mounted in the first and second PCM holders 140 and 150, it can be fixed by the coupling member 20. The coupling member 20 may be coupled to the coupling member grooves 147 and 157 of the first and second PCM holders 140 and 150, thereby fixing the PCM 160. Here, the coupling member 20 may be a screw.

While the PCM 160 is mounted on one battery cell 110 in the illustrated embodiment, it may be formed over top surfaces of a plurality of battery cells 110 according to the size and capacity of the battery pack 100. Accordingly, the PCM holders 140 and 150, on which the PCM 160 is mounted, may also be formed in plurality.

Figure 8:
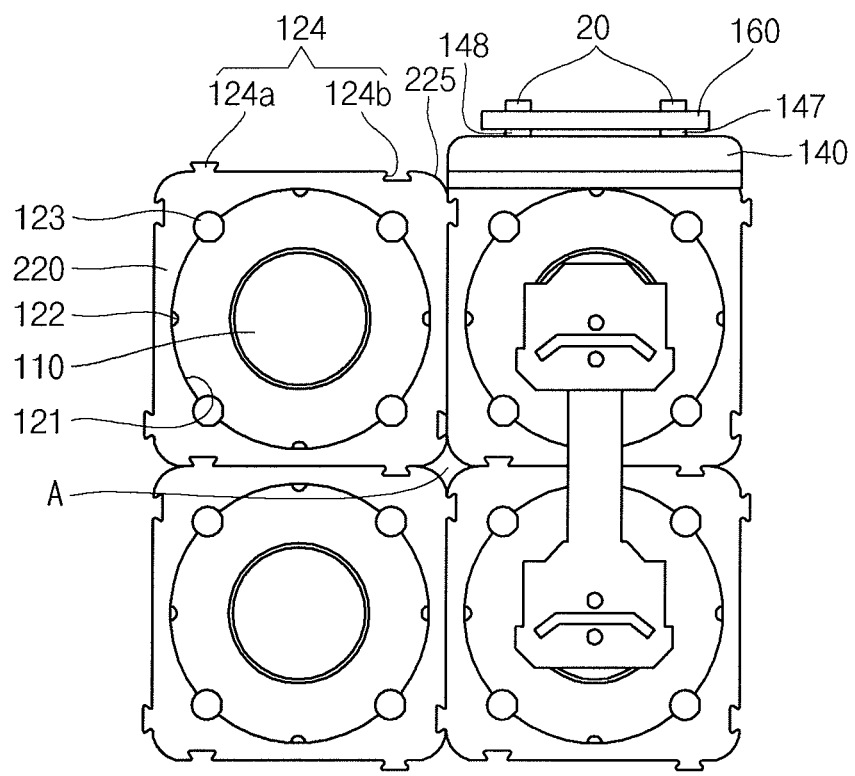
FIG. 8 is a front view illustrating a first cell holder in a battery pack according to another embodiment corresponding to the battery pack shown in FIG. 2.

FIG. 8 is a front view illustrating a first cell holder in a battery pack according to another embodiment corresponding to the battery pack shown in FIG. 2.

The battery pack in the FIG. 8 embodiment is substantially the same as the battery pack 100 shown in FIG. 2, in view of configuration and functions, except for a configuration of the first cell holder 220. Thus, repeated illustration and explanations of the same configuration and components will be omitted, and the following description will focus on the first cell holder 220.

Referring to FIG. 8, the first cell holder 220 includes a cell hole 121, fixing protrusions 122, locking protrusions 123, coupling portions 124 and curved parts 225.

In some embodiments, the curved parts 225 are formed at corners of the first cell holder 220 and have a predetermined curvature. As shown in FIG. 8, a space A is formed by the curved parts 225 of neighboring first cell holders 220. The space A is formed along the longitudinal direction of the battery cell 110 and serves as a path for discharging heat generated from the battery cell 110. In addition, the greater the curvature of each of the curved parts 225, the wider the space A, thereby allowing the heat generated from the battery cell 110 to be discharged more rapidly.

According to at least one of the disclosed embodiments, a battery pack includes a cell holder having coupling portions on its side surfaces, thereby facilitating assembly of the battery pack with another cell holder and easy assembly of the battery pack. In addition, the battery pack includes a first PCM holder and a second PCM holder coupled to a cell holder, thereby fixing the cell holder to the battery cell and easy assembly of the battery pack.

Although the above embodiments have been described with reference to the accompanying drawings, it will be understood by those skilled in the art that a variety of modifications and variations may be made to the embodiments without departing from the spirit or scope of the present invention defined in the appended claims, and their equivalents.

What is claimed is:

1. A battery pack comprising:
a battery cell comprising first and second sides opposing each other;
a first cell holder coupled to the first side of the battery cell;
a second cell holder coupled to the second side of the battery cell;
a first protection circuit module (PCM) holder slidably engaged with and covering a top surface and only one side surface of the first cell holder; and
a second PCM holder slidably engaged with and covering a top surface and only one side surface of the second cell holder and combined with the first PCM holder.

2. The battery pack of claim 1, wherein the first cell holder comprises i) a first surface, ii) a second surface opposite to the first surface, and iii) three additional side surfaces, wherein the one side surface and the three additional side surfaces interconnect the first and second surfaces.

3. The battery pack of claim 2, wherein the first cell holder comprises a cell hole passing through the first and second surfaces, a fixing protrusion formed on an internal surface of the cell hole, a locking protrusion protruding from the first surface and extending to the cell hole, and a coupling portion formed on the side surfaces.

4. The battery pack of claim 3, wherein each of the coupling portions comprises a coupling protrusion formed at a first side of the side surfaces, wherein a coupling groove formed at a second side of the side surfaces and formed to correspond to the coupling protrusion, and wherein the first and second sides are opposing each other.

5. The battery pack of claim 4, wherein the coupling portion further comprises a curved part formed at a corner where neighboring side surfaces meet and having a predetermined curvature.

6. The battery pack of claim 5, wherein the curved part forms a path configured to discharge heat generated from the battery cell.

7. The battery pack of claim 3, wherein a fixing groove corresponding to the fixing protrusion is formed on an external surface of the battery cell and between the first and second sides of the battery cell.

8. The battery pack of claim 3, wherein a diameter of the cell hole is substantially the same as an outer diameter of the battery cell.

9. The battery pack of claim 3, wherein the cell hole is configured to expose an electrode terminal of the battery cell to the outside.

10. The battery pack of claim 3, wherein a lower coupling portion corresponding to the coupling portion of the first cell holder is formed on a bottom surface of the first PCM holder, and wherein the lower coupling portion is slidably coupled to the coupling portion.

11. The battery pack of claim 1, wherein at least one preventing bump is formed at an end of each of the first and second PCM holders, wherein the preventing bump is configured to prevent the first and second PCM holders from being separated from the first and second cell holders.

12. The battery pack of claim 1, wherein a first fastening portion is formed at a first end of the first PCM holder, wherein a second fastening portion is formed at a second end of the second PCM holder and fastened to the first fastening portion, and wherein the first and second ends face each other.

13. The battery pack of claim 12, wherein the first fastening portion comprises i) a first fastening lead protruding from the first end of the first PCM holder, ii) a first fastening groove formed inwardly from the first end of the first PCM holder and parallel with the first fastening lead, and iii) a first protrusion hole formed in the first fastening groove and opened toward a top surface of the first PCM holder.

14. The battery pack of claim 13, wherein the second fastening portion comprises i) a second fastening lead protruding from the second end of the second PCM holder and coupled to the first fastening groove, ii) a second fastening groove formed inwardly from the second end of the second PCM holder and coupled to the first fastening lead, and iii) a second protrusion hole formed in the second fastening groove and opened toward a top surface of the second PCM holder.

15. The battery pack of claim 14, wherein a first protrusion is formed in the first fastening lead, and wherein the first protrusion is configured to be engaged with the second protrusion hole.

16. The battery pack of claim 14, wherein the second protrusion is formed in the second fastening lead, and wherein the second protrusion is configured to be engaged with the first protrusion hole.

17. The battery pack of claim 1, further comprising a protection circuit module (PCM) mounted on the first PCM holder and the second PCM holder.

18. The battery pack of claim 17, wherein each of the first and second PCM holders further comprises a coupling member groove protruding from a top surface thereof, and wherein a coupling member is configured to be coupled to the coupling member groove to fix the PCM to the first and second PCM holders.

19. The battery pack of claim 18, further comprising a dummy member formed on the top surface of each of the first and second PCM holders to be spaced apart from the coupling member groove and having substantially the same height as the coupling member groove.

20. A battery pack comprising:
- a first cell holder configured to hold a first portion of a battery cell;
- a second cell holder configured to hold a second portion of the battery cell, wherein the second portion is different from the first portion;
- a protection circuit module (PCM);
- a first PCM holder comprising first and second surfaces opposing each other, wherein the first surface is slidably engaged with and covering a top surface and only one side surface of the first cell holder, and wherein the second surface is coupled to the PCM; and
- a second PCM holder comprising first and second surfaces opposing each other, wherein the first surface of the second PCM holder is slidably engaged with and covering a top surface and only one side surface of the second cell holder, wherein the second surface of the second PCM holder is coupled to the PCM, and wherein the first and second PCM holders are configured to be attached to and detached from each other.

* * * * *